United States Patent
Min

(10) Patent No.: US 9,099,692 B2
(45) Date of Patent: Aug. 4, 2015

(54) RECHARGEABLE BATTERY

(71) Applicants: Hyundai Motor Company, Seoul (KR); Kia Motors Corporation, Seoul (KR)

(72) Inventor: Hong Seok Min, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 112 days.

(21) Appl. No.: 13/839,639

(22) Filed: Mar. 15, 2013

(65) Prior Publication Data

US 2014/0127544 A1      May 8, 2014

(30) Foreign Application Priority Data

Nov. 7, 2012   (KR) .................. 10-2012-0125305

(51) Int. Cl.
| | |
|---|---|
| *H01M 10/50* | (2006.01) |
| *H01M 2/02* | (2006.01) |
| *H01M 2/24* | (2006.01) |
| *H01M 10/655* | (2014.01) |
| *H01M 10/613* | (2014.01) |
| *H01M 10/625* | (2014.01) |
| *H01M 10/647* | (2014.01) |

(52) U.S. Cl.
CPC .......... *H01M 2/024* (2013.01); *H01M 10/5044* (2013.01); *H01M 10/5004* (2013.01); *H01M 10/5016* (2013.01); *H01M 10/5032* (2013.01)

(58) Field of Classification Search
USPC ........................................ 429/120, 178, 179
See application file for complete search history.

(56) References Cited

U.S. PATENT DOCUMENTS

| | | | |
|---|---|---|---|
| 6,451,476 B1 * | 9/2002 | Chang et al. | 429/127 |
| 7,794,871 B2 * | 9/2010 | Kim | 429/159 |
| 2006/0121344 A1 * | 6/2006 | Amagai et al. | 429/176 |
| 2012/0214051 A1 * | 8/2012 | Tsukuda et al. | 429/179 |

FOREIGN PATENT DOCUMENTS

| | | |
|---|---|---|
| JP | 07-235326 A | 9/1995 |
| JP | 2006-172911 A | 6/2006 |
| JP | 2008-165989 A | 7/2008 |
| KR | 10-2002-0012397 | 2/2002 |
| KR | 2002-0012397 A | 2/2002 |
| KR | 1020080012872 A | 2/2008 |
| KR | 1020080037199 A | 4/2008 |
| KR | 10-0909164 B1 | 7/2009 |
| KR | 2010-0081942 A | 7/2010 |
| WO | WO 2011153312 A2 * | 12/2011 |

* cited by examiner

*Primary Examiner* — Gregg Cantelmo
(74) *Attorney, Agent, or Firm* — Mintz Levin Cohn Ferris Glovsky and Popeo, P.C.; Peter F. Corless

(57) ABSTRACT

A rechargeable battery is provided, including: a cabinet provided with two electrode terminals for connecting inner and outer parts thereof, to which an anode and a cathode are connected, respectively, and being formed with a cooling fluid channel on a bottom surface of the cabinet; an electrode plate received in the cabinet together with an electrolyte such that both ends of the electrode plate are connected to the internal electrode terminal; and a cover which covers an opened portion of the cabinet and is wound together with the cabinet while an edge of the cover overlaps with the edge of the cabinet to seal the cabinet.

4 Claims, 7 Drawing Sheets

(a)

(b)

RECHARGEABLE BATTERY

CROSS-REFERENCE TO RELATED APPLICATION

This application claims under 35 U.S.C. §119(a) the benefit of Korean Patent Application No. 10-2012-0125305 filed Nov. 7, 2012, the entire contents of which are incorporated herein by reference.

BACKGROUND (a) Technical Field

The present invention relates to a rechargeable battery, and more particularly, to a rechargeable battery designed for a vehicle, and provided with cells preferably of high output, high capacity and light weight.

(b) Description of the Related Art

Generally, a lithium ion rechargeable battery has attracted public attention as a next generation energy storage medium, and it has been used in various fields such as electronics, vehicles, a smart grid, etc. Specially, a lithium ion rechargeable battery applied to a vehicle has preferred characteristics of light weight and low cost as well as high output and high capacity.

The lithium ion rechargeable battery used for a vehicle has various forms, which are different based on the requirements of different manufacturers, and two such forms may be classified as a can type and a pouch type. A cell type of lithium ion rechargeable battery can be selected based on the manufacturer thereof, and then a module and a pack are configured corresponding to the selected cell type. However, there arises a need to select a cell type designed specifically for a vehicle, considering the importance of management of a module and a pack.

FIG. 1(a) is a perspective view illustrating a can type cell according to a related art and FIG. 1(b) is a perspective view illustrating a pouch type cell according to a related art. In conventional cells of a can type and a pouch type, there arise drawbacks that in a case of the can type cell, it is difficult to bond different kinds of materials of laser metal and insulation material, liquid is leaked due to poor laser welding, weight of exterior material increases the weight thereof, manufacturing procedures of module/pack system are complicated, and the number of components is increased.

Further, in a case of the pouch type cell, defects such as cracks or fine holes, which cannot be detected in a manufacturing process, may be generated so that air or moisture can permeate into the defects, corrosion may be made, and insulation may be ruptured therethrough. Meanwhile, it is weak to a physical impact and thus additional protection units are needed to cause poor cells after manufacturing module/pack.

The description provided above as to the related art is just for helping understanding the background of the present invention and should not be construed as being included in the related art known by those skilled in the art.

SUMMARY OF THE DISCLOSURE

The present invention has been made in an effort to solve the above-described problems associated with the related art, and an object of the present invention is to provide a rechargeable battery specified for a vehicle, provided with cells of high output, high capacity and light weight.

In order to achieve the object of the present invention, the present invention provides a rechargeable battery including: a cabinet provided with two electrode terminals for connecting inner and outer parts thereof, to which an anode and a cathode are connected, respectively, and being formed with a cooling fluid channel on a bottom surface of the cabinet; an electrode plate received in the cabinet together with an electrolyte such that both ends of the electrode plate are connected to the internal electrode terminal; and a cover which covers an opened portion of the cabinet and is wound together with the cabinet while an edge of the cover overlaps with an edge of the cabinet to seal the cabinet.

The cooling fluid channel may be formed in a groove shape on a bottom surface of the cabinet, and external air preferably passes through the cooling fluid channel.

A weak portion may be formed on a part of a side surface of the cabinet and is broken when an internal pressure of the cabinet in increased.

A first arrangement may be formed on a bottom corner of the cabinet as a groove or protrusion shape, and a second arrangement may be formed on an upper corner of the cover as a groove or a protrusion shape corresponding to the first arrangement so that the first arrangement is arranged to be fitted into the second arrangement formed on an adjacent cover, and the second arrangement is arranged to be fitted into the first arrangement (for example, of another cabinet) to form a lamination configuration.

The cabinet and the cover may be made of a thin film of material.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
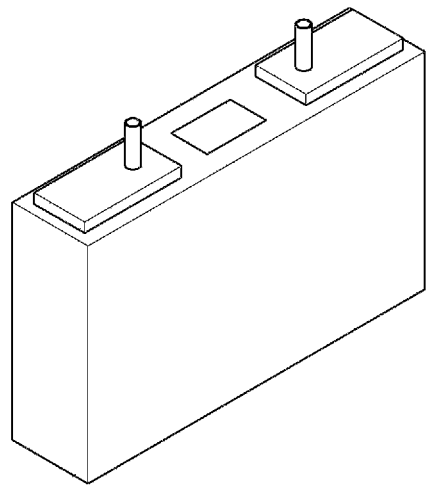
FIG. 1(a) (RELATED ART) is a perspective view illustrating a can type cell according to a related art.
FIG. 1(b) (RELATED ART) is a perspective view illustrating a pouch type cell according to a related art.
Figure 1:
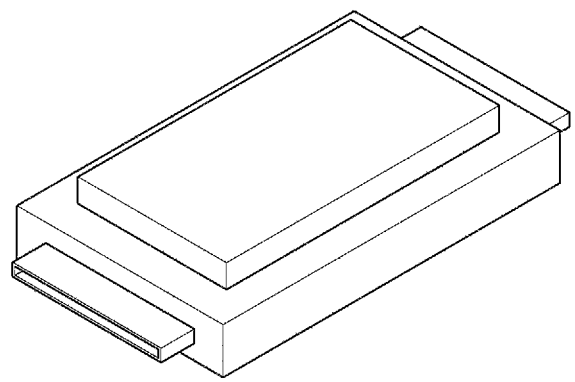

It should be understood that the appended drawings are not necessarily to scale, presenting a somewhat simplified representation of various preferred features illustrative of the basic principles of the invention.

In the figures, reference numbers refer to the same or equivalent parts of the present invention throughout the several figures of the drawing.

DETAILED DESCRIPTION

Hereinafter, preferred embodiments of the present invention will be described referring to the accompanying drawings.

A rechargeable battery according to the present invention may be provided with a single, separate cell or a plurality of cells which are laminated together, where each cell 1 preferably includes at least a cabinet 10, an electrode plate 30, and a cover 20. For example, FIG. 2 depicts an exemplary cell 1, where additional cells may be constructed in a similar manner.

Referring to FIGS. 2 to 8, a rechargeable battery according to the present invention may include: a cabinet 10 provided with two electrode terminals 12a, 12b for connecting inner and outer parts thereof, to which an anode and a cathode are connected, respectively, and being formed with a cooling fluid channel on a bottom surface of the cabinet 10; an electrode plate 30 received in the cabinet 10 together with an electrolyte such that both ends of the electrode plate 30 are connected to the internal electrode terminal 12b; and a cover 20 which covers an opened portion of the cabinet 10 and is wound together with the cabinet 10 while an edge of the cover 20 overlaps with an edge of the cabinet 10 to seal the cabinet 10.

Figure 2:
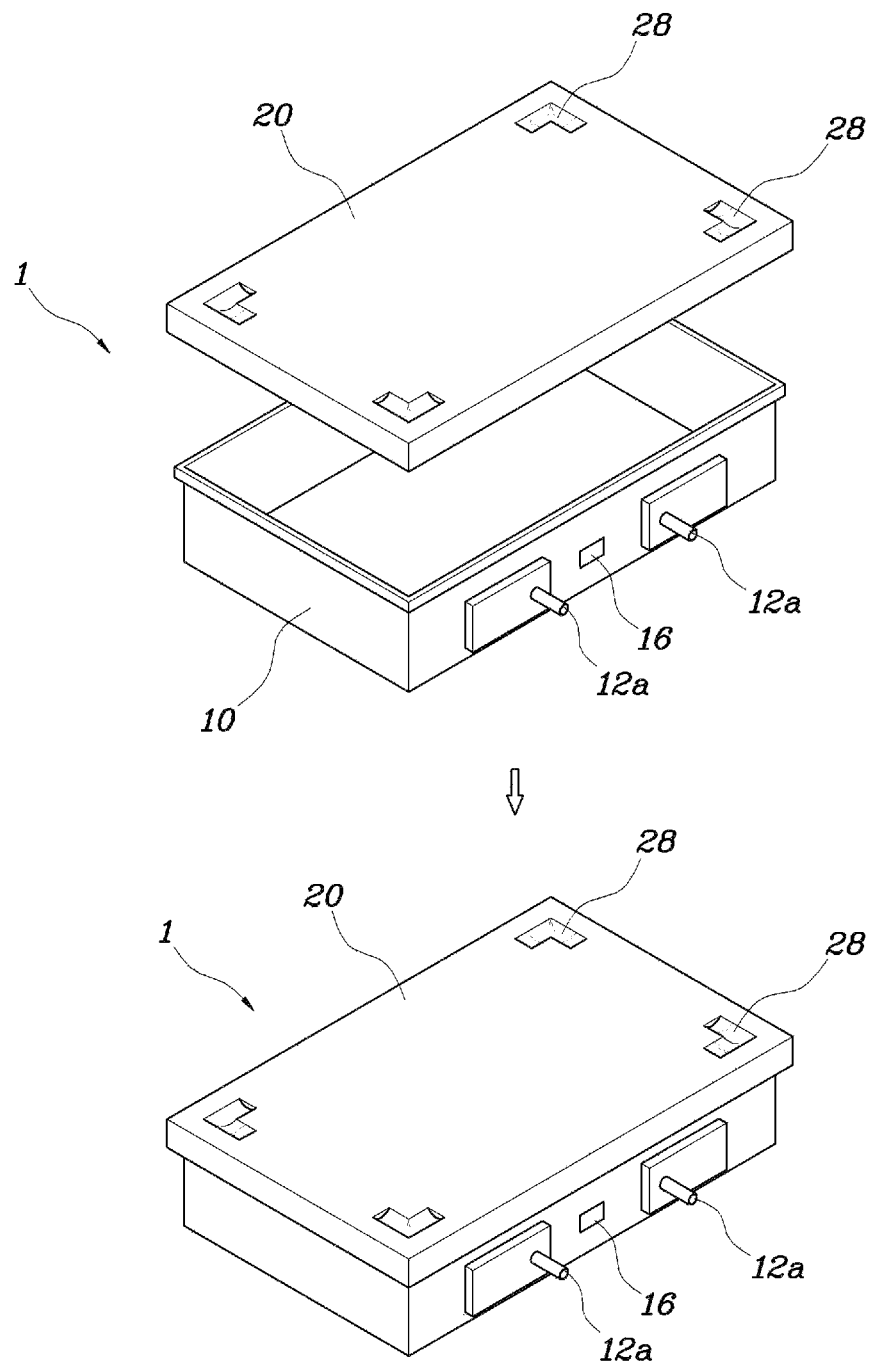
FIG. 2 is a view illustrating a rechargeable battery in different states before a cover is placed on top of a cabinet, and after the cover is placed on top of the cabinet, respectively, according to an embodiment of the present invention.
Figure 3A:
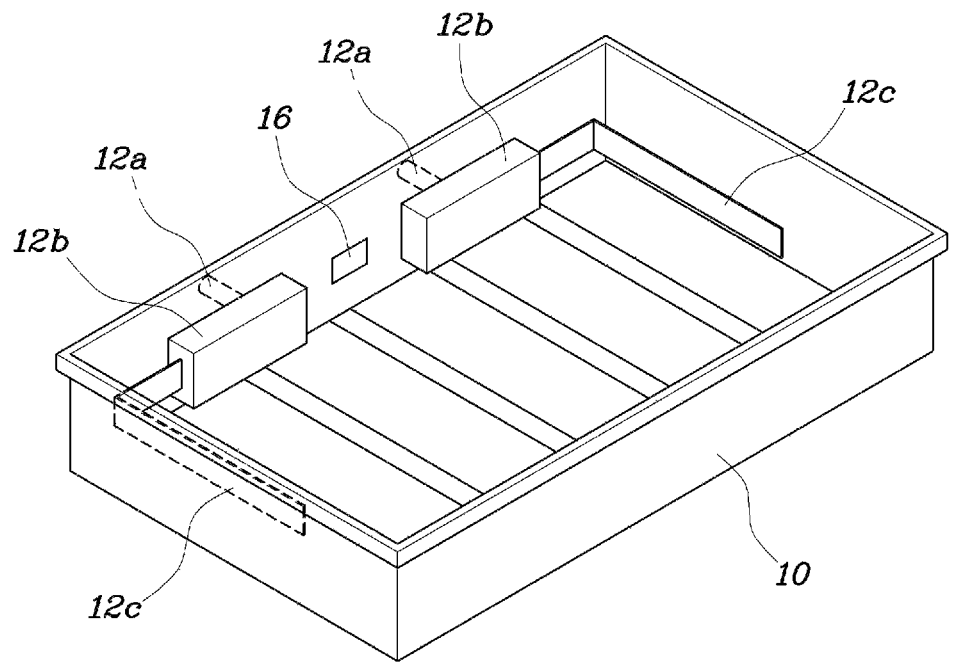
FIGS. 3(a) and 3(b) are perspective views of an internal shape and a bottom surface shape of a cabinet, respectively, according to an embodiment of the present invention.
Figure 3B:
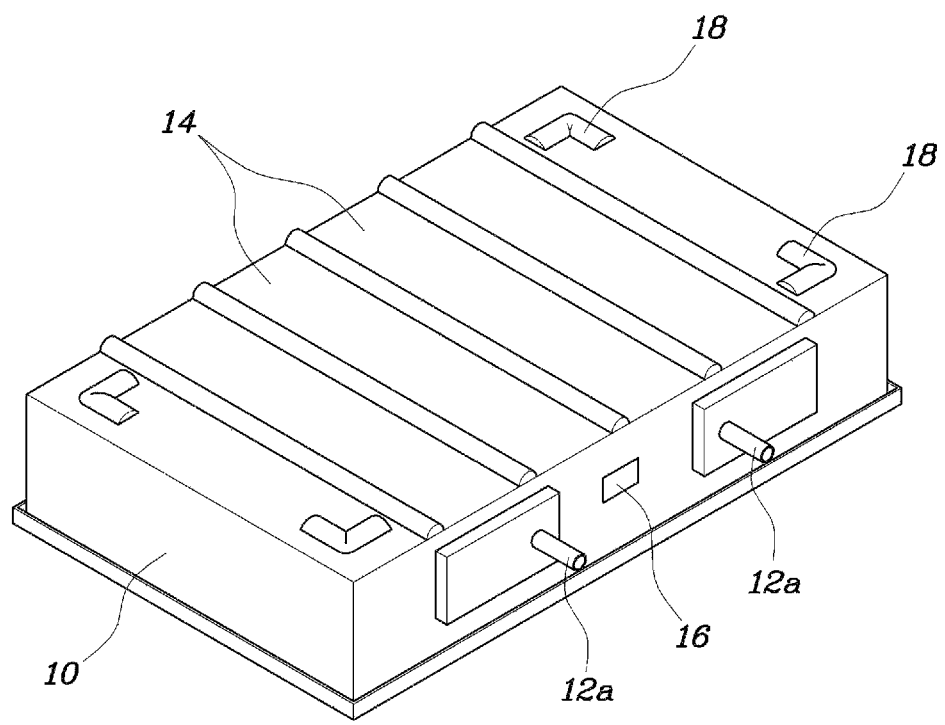

FIG. 2 is a view illustrating a rechargeable battery in different states before a cover is placed on top of a cabinet, and after the cover is placed on top of the cabinet, respectively, according to an embodiment of the present invention, and FIGS. 3(a) and 3(b) are perspective views of an internal shape and a bottom surface shape of a cabinet, respectively, according to an embodiment of the present invention.

Referring to FIGS. 2 to 3(b), the electrode terminals 12a, 12b may be provided through the cabinet 10 to be connected electrically to the inner and outer sides of the cabinet 10, where an anode is connected to the electrode terminals 12a, 12b on one side and a cathode is connected to the electrode terminals 12a, 12b on the other side.

Moreover, a lead tap 12c may be connected to the inner electrode terminal 12b, which may be connected electrically to a separation plate, which will be described later. For example, the lead tap 12c may be bent at a predetermined length to be connected electrically to both sides of the separation plate.

Figure 7:
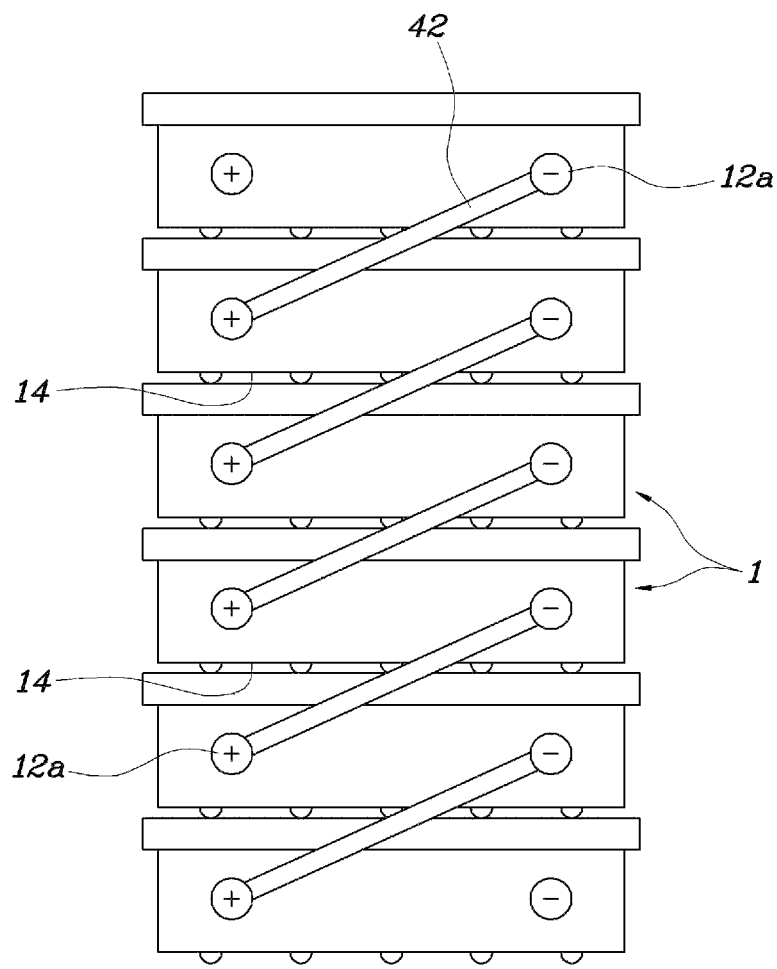
FIG. 7 is a view illustrating a cooling fluid channel where a plurality of cells are laminated according to an embodiment of the present invention.

FIG. 7 is a view illustrating a cooling fluid channel 14 where a plurality of cells 1 are laminated according to an embodiment of the present invention. In particular, the cooling fluid channel may be formed on a bottom surface of the cabinet 10 to air cool the cell 1 (see FIG. 3(b)).

Referring to FIGS. 3(a), 3(b) and 7, a plurality of jaws may be protruded transversely or lengthwise on a bottom surface of the cabinet 10, where the cooling fluid channel 14 may be formed in a groove shape between the jaws. Accordingly, external air passes through the cooling fluid channel 14 to cool the cell 1, and it generally has excellent radiation property.

Further, the cabinet 10 according to the present invention may be fabricated with a thin film of metal material. Also, the cover 20, which will be described later, may be fabricated with a thin film of metal material. That is, the cabinet 10 and the cover 20 preferably are made of a thin metal material, designed to maintain a rigidity at a predetermined level, to reduce a weight of the rechargeable battery and a dual sealing structure, which will be described later, of the cabinet 10 and the cover 20. Further, the rechargeable battery of a can type generally has a stronger rigidity than that of a rechargeable battery of a pouch type to minimize defects on an outer appearance which may be caused during transportation and handling thereof, and prevent formation of poor modules and packs of a rechargeable battery system.

As shown in FIG. 2, the cabinet 10 according to the present invention may have a weak portion 16 at a side surface thereof. In particular, the weak portion 16 may be broken when an internal pressure of the cabinet 10 is increased due to gas generation by overcharging of the cell 1, to prevent explosion of the cell 1.

Further, the weak portion 16 may be thinner than a part of the cabinet 10 which surrounds it, and an additional groove portion along a circumference of the weak portion 16 may be pressured and torn down.

Figure 4:
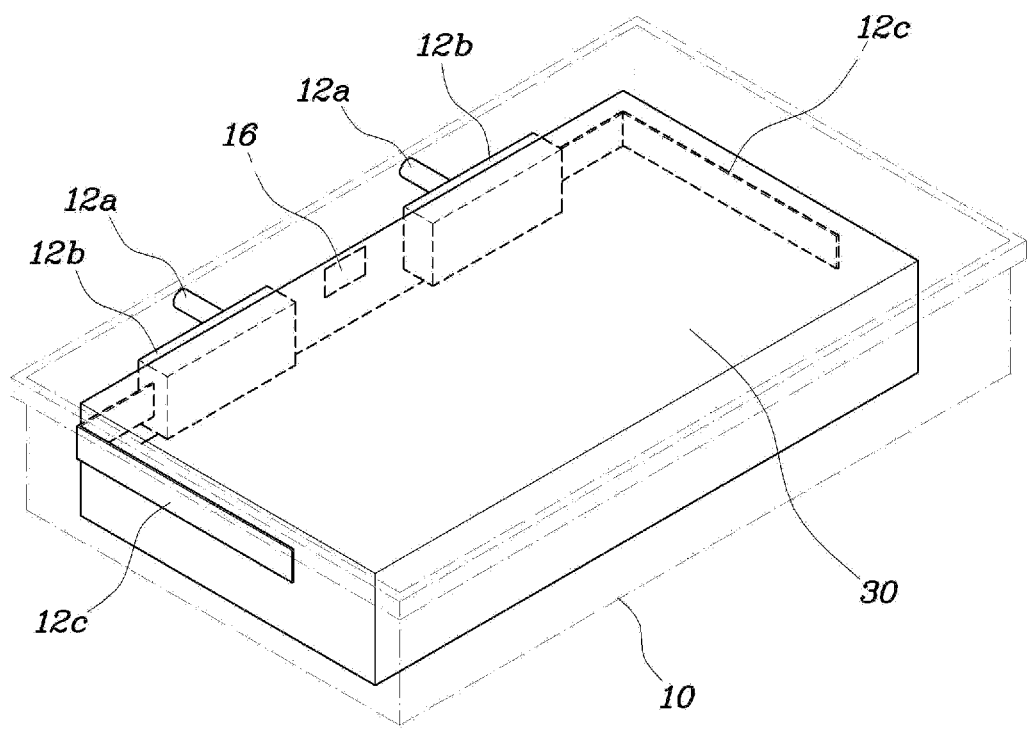
FIG. 4 is a view illustrating a separation plate that is housed in and fastened to a cabinet according to an embodiment of the present invention.
Figure 5A:
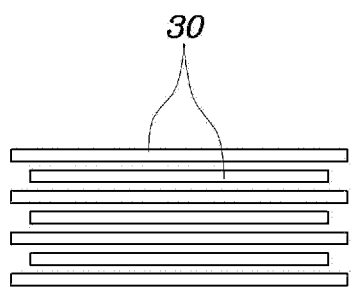
FIGS. 5(a) and 5(b) are views illustrating a configuration of the separation plate according to an embodiment of the present invention.
Figure 5B:
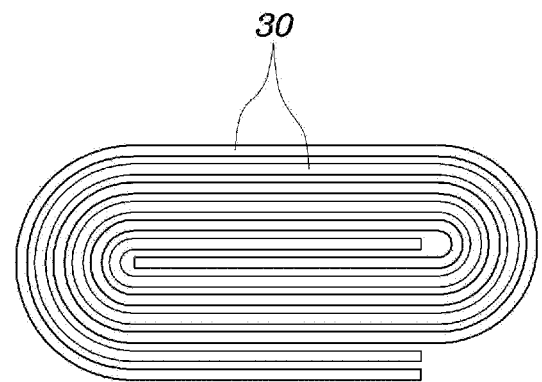

FIG. 4 is a view illustrating a separation plate that is housed in and fastened to a cabinet 10 according to an embodiment of the present invention, and FIGS. 5(a) and 5(b) are views illustrating a configuration of the separation plate according to an embodiment of the present invention.

Referring to FIGS. 4 to 5(b), the electrode plate 30 may be received inside of the cabinet 10 together with an electrolyte and connected to the lead tap 12c having ends connected to the inner electrode terminal 12b. In particular, the electrode plate 30 may be connected to the lead tap 12c by using ultrasonic melting, and insulation tape may be attached to the melted portion to insulate the cabinet 10, the cover 20, and the electrode terminal 12b. For example, the insulation tape may be a tape made of Polypropylene (PP) and Polyimide (PI).

The electrode plate 30 as described above may be formed as a lamination type, as shown in FIG. 5(a), or as a jelly roll type, as shown in FIG. 5(b). In particular, in case the electrode plate 30 is the lamination type, uniform retraction and inflation are made on a surface of the electrode to implement good immersion of electrolyte and excellent radiation.

Figure 6:
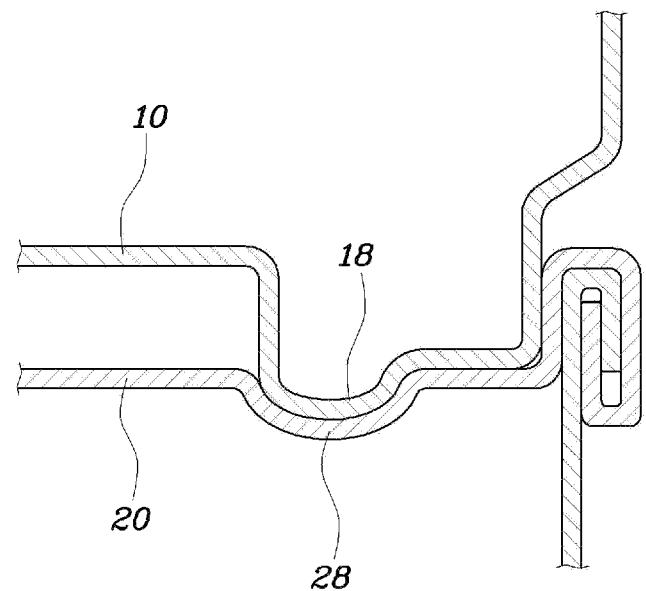
FIG. 6 is a view illustrating a sealing configuration of a cabinet and a cover which are arranged for lamination according to an embodiment of the present invention.

FIG. 6 is a view illustrating a sealing configuration of the cabinet 10 and the cover 20 which are arranged for lamination according to an embodiment of the present invention. Referring to FIG. 6, the cover 20 may cover an opened portion of the cabinet 10 and be wound together with the cabinet 10, while an edge of the cover 20 overlaps an edge of the cabinet 10.

In particular, the edges of the cover 20 and the cabinet 10 preferably are overlapped and wound toward an outside of the cabinet 10 to seal the cabinet 10. In detail, an end of the edge of the cabinet 10 enters into the inside where the edge of the cover is wound, and an end of the edge of the cover 20 enters into the inside where the edge of the cabinet 10 is wound to form a dual seal of the cabinet 10. One cell 1 may be laminated over another cell 1 by arranging as a lamination configuration a first arrangement 18 formed on the cabinet 10 and a second arrangement formed on the cover 20.

Referring to FIG. 6, the first arrangement 18 may be formed on a bottom corner of the cabinet 10 in a groove or protrusion shape, and the second arrangement 28 may be formed on an upper corner of the cover 20 in a groove or a protrusion shape corresponding to the first arrangement 18 such that the first arrangement 18 is fitted into the second arrangement 28 formed on an adjacent cover 20, and the second arrangement 28 is fitted into the first arrangement 18 (for example, of another cabinet) to form a lamination configuration.

Preferably, the first arrangement 18 may formed in a protrusion shape and the second arrangement 28 may be formed in a groove shape into which the protrusion is fitted to form the lamination configuration.

Figure 8:
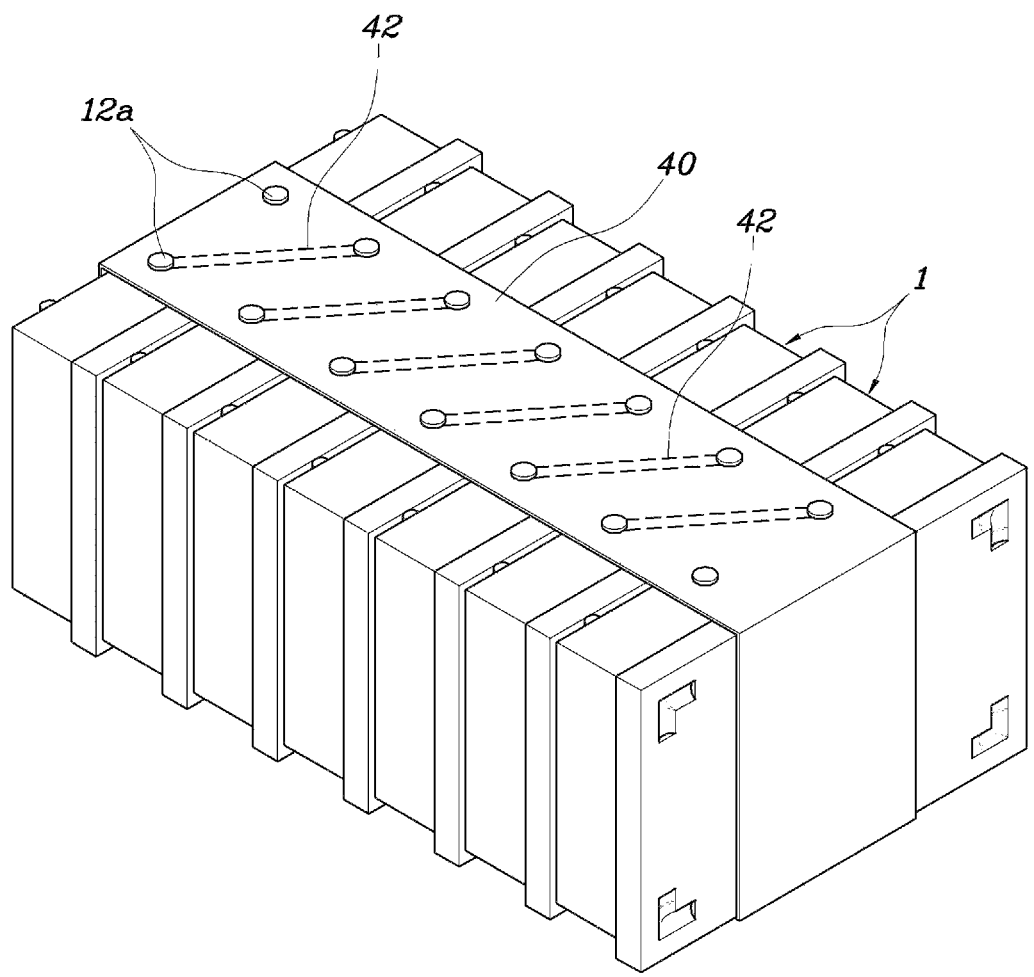
FIG. 8 is a perspective view illustrating a plurality of cells which are laminated according to an embodiment of the present invention.

FIG. 8 is a perspective view illustrating a plurality of cells 1 which are laminated according to an embodiment of the present invention.

Referring to FIG. 8, since the cabinet 10 and the cover 20 can be made of rigid material and the cooling fluid channel can be formed in the rechargeable battery according to the present invention, a module can be formed immediately after the cells 1 are laminated without using an additional aluminum plate. Further, the cells 1 may be connected by a busbar 42, and durability against vibration can be improved by using a pressing band connected to the busbar 42. Through this configuration, the number of components of the module and pack system can be minimized to save cost, improve durability and reduce mounting volume.

Further, the first arrangement 18 and the second arrangement 28 can be formed such that the cells 1 can be fastened easily to the cabinet 10 and the cover 20 to fabricate a battery module/pack without requiring additional members.

A method for manufacturing a rechargeable battery according to the present invention will be described.

The electrode plate 30 may be housed on the inside of the cabinet 10 and then connected to the electrode terminal 12b. In particular, the lead tap 12c provided within the cabinet 10 can be bent and connected to the electrode plate 30 such that the electrode plate 30 is connected to the electrode terminals 12a, 12b while it is housed inside of the cabinet 10.

Further, an electrolyte is injected into the cabinet while the cabinet is opened such that the electrolyte can be injected and immersed easily. Additionally, divided injection and re-injecting of the electrolyte can be possible due to a wide open area of the cabinet 10.

Since the cabinet 10 is made of rigid metal material, a liquid electrolyte can be used to reduce DC resistance and improve low temperature property of the cell 1.

Then, the cover 20 is disposed over the cabinet 10 and the edges of the cabinet 10 and the cover 20 are folded in an overlapping state to dually vacuum-seal and complete assembly of the cell 1.

Therefore, the adhering property among the cabinet 10, the cover 20, and the electrodes can be ensured with the vacuum-sealing and the DC resistance being reduced, and the radiation property is improved through the improvement of the adhering property. Further, the adhering property among the electrode plates 30 is improved by framing the electrode plate 30 for the vacuum-sealing.

According to the rechargeable battery of the present invention, the cabinet and the cover preferably are made of a thin rigid metal material, and thus weight of the rechargeable battery is reduced, and further a dual sealing can be applied to the cabinet and the cover to improve energy density of the battery and to improve assembly and reliability thereof to increase process efficiency.

Moreover, since the rechargeable battery of a can type according to the present invention has stronger rigidity than the rechargeable battery of a pouch type, outer appearance defects that may caused during a transportation and handling thereof for manufacturing can be minimized, poor manufacturing of the battery module and pack system can be prevented, and long durability against a vehicle vibration and external environment can be increased.

Further, the cooling fluid channel preferably is carved directly on the cabinet to minimize the number of components used for fastening modules among cells and to reduce the volume of the battery module/pack system, and further the weak portion is formed on the cabinet to prevent explosion of the battery when gas is generated due to overcharging the battery.

Also, the battery module and pack system can be fabricated easily to reduce radiation resistance by eliminating use of additional material and to minimize temperature deviation among the cells, and radiation property is excellent with the metal external mounting material to increase space utility for separately mounting it within a vehicle.

While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

What is claimed is:
1. A rechargeable battery comprising;
   a cabinet provided with two electrode terminals consisting of an external electrode terminal and an internal electrode terminal for connecting inner and outer parts thereof, to which an anode and a cathode are connected, respectively, and being formed with a cooling fluid channel on a bottom surface of the cabinet;
   an electrode plate received in the cabinet together with an electrolyte such that both ends of the electrode plate are connected to the internal electrode terminal; and
   a cover which covers an opened portion of the cabinet and is wound together with the cabinet while an edge of the cover overlaps with an edge of the cabinet to seal the cabinet,
   wherein a first arrangement is formed on a bottom corner of the cabinet as a groove or protrusion shape, and a second arrangement is formed on an upper corner of the cover as a groove or a protrusion shape, corresponding to the first arrangement so that the first arrangement is arranged to be fitted into the second arrangement formed on an adjacent cover, and the second arrangement is arranged to be fitted into the first arrangement of another cabinet to form a lamination configuration.

2. The rechargeable battery according to claim 1, wherein the cooling fluid channel is formed in a groove shape on the bottom surface of the cabinet, and external air passes through the cooling fluid channel.

3. The rechargeable battery according to claim 1, wherein a weak portion is formed on a part of a side surface of the cabinet and is broken when an internal pressure of the cabinet is increased.

4. The rechargeable battery according to claim 1, wherein the cabinet and the cover are made of a film of metal material.

* * * * *